Feb. 23, 1965   C. WEIDAUER   3,170,237

PINKING SHEARS

Filed Dec. 3, 1962

INVENTOR:
Curt Weidauer

BY Maxwell E. Sparrow

ATTORNEY.

United States Patent Office
3,170,237
Patented Feb. 23, 1965

3,170,237
PINKING SHEARS
Curt Weidauer, Clinton Corners, N.Y., assignor to
Samuel Briskman, New York, N.Y.
Filed Dec. 3, 1962, Ser. No. 241,922
3 Claims. (Cl. 30—268)

This invention relates to shears with blades having serrated or toothed cutting edges, such as pinking or scalloping shears, and more particularly to pivoting means for such pinking or scalloping shears. The invention consists in the novel parts, construction arrangements, combinations, and improvements herein shown and described.

Objects and advantages of the invention will be set forth in part hereafter and in part will be obvious herefrom or may be learned by practicing the invention, the same being realized and attained by means of the instrumentalities and combinations pointed out in the appended claims.

The continuous, daily use of pinking or scalloping shears is particularly tiring for the user's hand because the blades of such shears must be firmly pressed together in order to cleanly cut all kinds of fabrics, from light fabrics to heavy fabrics as well as multiple layers. Naturally, the adjusted pressure of the blades causes friction, and thus, these shears are normally hard to operate. Furthermore, the blades have to be re-adjusted from time to time due to the inevitable wear, whereby such adjustment must be made by trained craftsmen. If the adjustment and the setting of the pressure is not made correctly and properly, the shears have a tendency to spread on the tip of the blades, which happens particularly in conventional shears when a plurality of layers of fabric are to be cut.

It is the general object of this invention to improve the pivotal structure of the pinking or scalloping shears.

It is a further object of the present invention to provide a more substantial thrust bearing on the pivot of these shears.

Another object of the present invention is to provide for contrivances rendering the adjustment of the blades of these shears and the adjustment of the pressure between them automatically.

Yet another object of the present invention is to provide means for preventing spreading of the tips of the blades of these shears, when multiple layers of fabrics are being cut.

A still further object of the present invention is to provide a structure permitting inexperienced persons to take the shears apart and to re-assemble and re-adjust same.

Still another object of the present invention is to provide contrivances for preventing the amount of wear, such as in conventional shears.

Yet a further object of the present invention is to provide means permitting exertion of about twice as much pressure between the blades of these shears as can be applied in conventional shears.

Various further and more specific purposes, features and advantages will clearly appear from the detailed description given below taken in connection with the accompanying drawing which forms part of this specification and illustrates merely by way of example one embodiment of the device of the invention.

Figure 1:
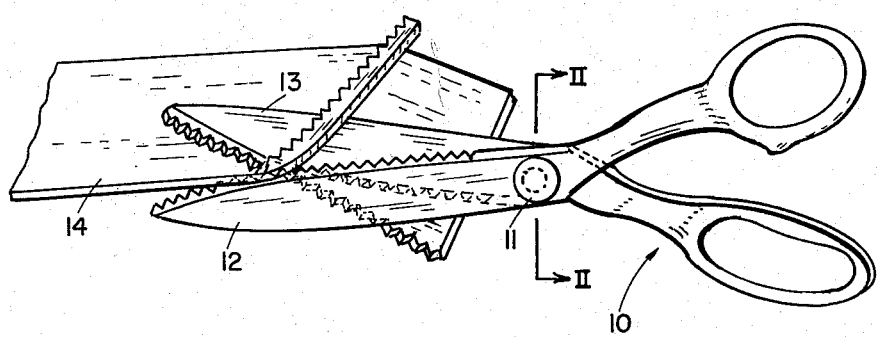
FIG. 1 is a general view of a pinking shears during the cutting of a substantially heavy piece of fabric.
Figure 2:
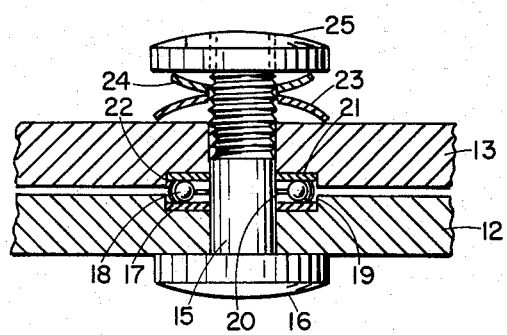
FIG. 2 is a section through the pivot of the shears shown in FIG. 1, partly broken away, along the line II—II in FIG. 1.

In the following description and in the claims, parts will be identified by specific names for convenience, but such names are intended to be as generic in their application to similar parts as the art will permit. Like reference characters denote like parts in the figures of the drawing.

Referring now in more detail to the drawing illustrating a preferred embodiment by which the invention may be realized, there is shown in FIG. 1 typical pinking shears having the general numeral 10, having a pivotal point 11, a lower blade 13 and an upper blade 12. A substantially heavy piece of fabric 14 is shown being cut near the tips of the blades 12, 13.

This invention is also applicable to scalloping shears, such as of the type shown in U.S. Patent No. 2,850,803. Therefore, the use of the term "pinking shears," both in the specification and in the claims, is meant to include scalloping shears and similar shears having serrated cutting edges.

The enlarged section of the pivotal point 11, taken along the line II—II of FIG. 1, shows blades 12, 13 and the pivot 15 having a substantially flat head 16. A washer 17, serving as a lower raceway for a thrust bearing 18 and consisting of a hardened, precision ground and highly polished piece of steel, is inserted in a recess 19, counterbored in lower blade 12 of shears 10. Thrust bearing 18 comprises a plurality of highly polished, hardened steel balls having a calibrated diameter and being held properly spaced apart in a cage 20. A washer 21, similar and equal to washer 17, is inserted in a recess 22, counterbored in upper blade 13 and serves as an upper raceway for thrust bearing 18.

The proper relation between the depth of counterbored recesses 19 and 22 and the height of the teeth (nearest pivot 15) of blades 12, 13 of shears 10 is important for providing the desired pivotal adjusting feature. In a preferred embodiment, the precise thickness of washers 17 and 21 is .032" and the diameter of the balls of thrust bearing 18 is held to .09375". Thus, in combination with pivot 15, a substantial, strong bearing is achieved. A dish- or cup-shaped spring washer 23 is placed on top of upper blade 13 and a second dish- or cup-shaped spring washer 24, preferably smaller in diameter than washer 23, is placed on top of washer 23 in such a manner that the dished inner diameters of the two washers are placed against one another, so that the outside diameters of the washers abut against the surface of blade 13 and against the nut 25 screwed on pivot 15.

It is obvious that by tightening nut 25, a substantial amount of pressure can be exerted on blades 12 and 13. Since thrust bearing 18 is substantially an anti-friction bearing, it also is obvious that the operation of the shears is made easier despite the increase of pressure between blades 12 and 13. Because of the pivot arrangement and with the tightened dished spring washers, the spread of the tips of the blades, which handicaps the cutting of heavier fabrics in the area of these tips, is successfully avoided.

While the invention has been described and illustrated with respect to a certain preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

I claim:
1. In pinking shears having blades, said blades having corresponding engaging cutting edges, said blades mounted on a common pivot for swinging about a common axis, said pivot having a head on one end and a threaded portion on the other end thereof, said cutting blades being freely swingable about said pivot independent from one another; anti-friction thrust bearing means on said pivot, said bearing means being disposed between said blades keeping the engagement of the cutting edges thereof in constant correct cutting relationship with one another, and spring means on said pivot holding said cutting edges of said blades in cutting engagement with one another under constant pressure, said spring means comprising at least two substantially dish-shaped spring washers.

2. In pinking shears according to claim 1, and means on said pivot adjusting the pressure of said spring means.

3. Shears comprising cutting blades, said cutting blades being swingably mounted on a common pivot, said pivot having a head on one end and a threaded portion on the other end thereof, said cutting blades being freely swingable about said pivot independent from one another, anti-friction bearing means on said pivot, said bearing means being interposed between said blades and being housed in opposed recesses provided in said blades, spring means on said pivot, said spring means abutting against one of said blades maintaining said blade in proper cutting relation to said other blade, and a nut on said threaded portion, said nut tightening said spring means, said spring means comprising at least two substantially dish-shaped spring washers.

References Cited by the Examiner

UNITED STATES PATENTS

| | | | |
|---|---|---|---|
| 826,587 | 7/06 | Linscott | 30—267 |
| 946,441 | 1/10 | Homme et al. | 30—268 X |
| 981,436 | 1/11 | Lewis | 30—268 |
| 1,315,435 | 9/19 | Thompson | 30—268 |
| 1,964,676 | 6/34 | Schmitz | 30—268 X |
| 2,685,735 | 8/54 | Sorensen | 30—267 X |
| 2,741,844 | 4/56 | Sejman et al. | 30—268 |

FOREIGN PATENTS

| | | |
|---|---|---|
| 22,712 | 1903 | Great Britain. |
| 738,206 | 10/55 | Great Britain. |

WILLIAM FELDMAN, *Primary Examiner.*

EDWARD V. BENHAM, *Examiner.*